Feb. 21, 1933.　　　F. P. HODGKINSON　　　1,898,663
WELDED CASING
Filed April 25, 1930
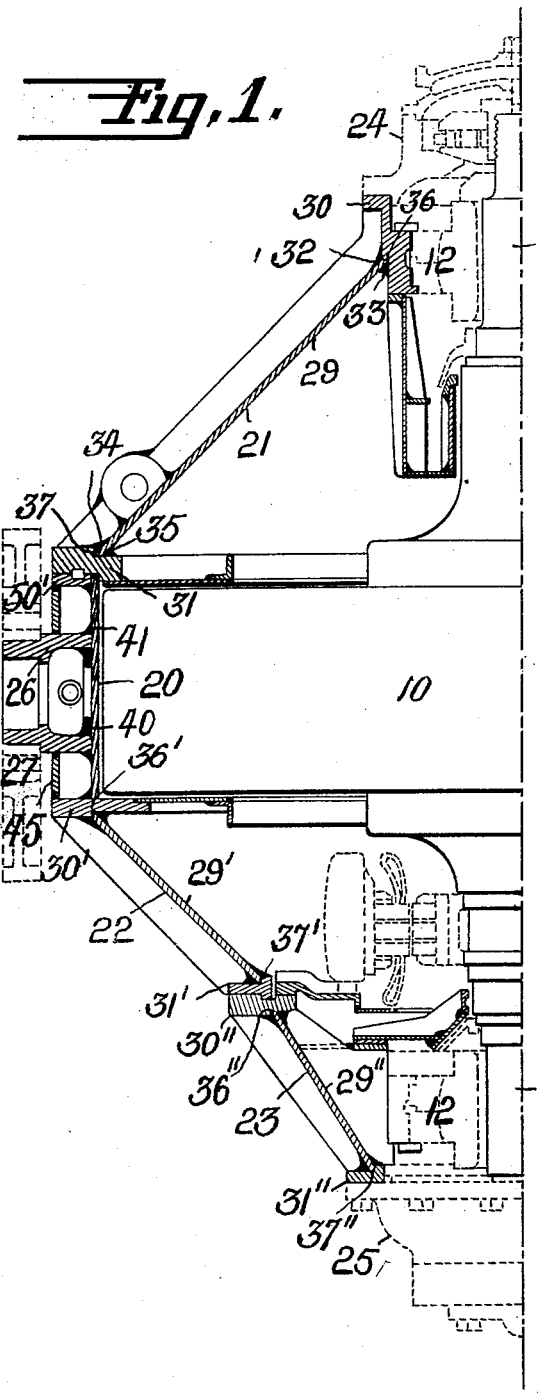
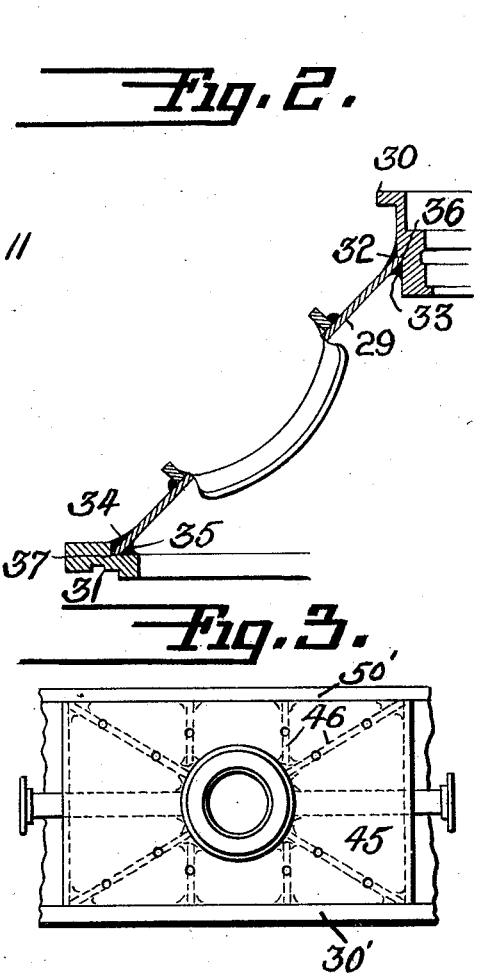
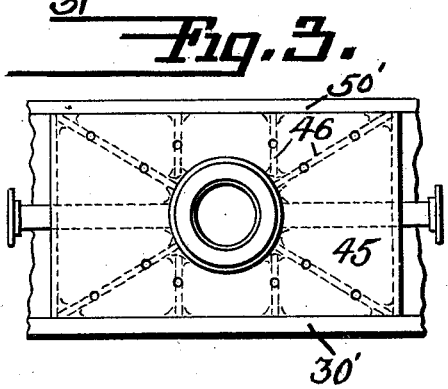
INVENTOR
FRANCIS P. HODGKINSON.
BY
Herbert H. Thompson
his ATTORNEY.

Patented Feb. 21, 1933

1,898,663

UNITED STATES PATENT OFFICE

FRANCIS P. HODGKINSON, OF NEW YORK, N. Y., ASSIGNOR TO SPERRY GYROSCOPE COMPANY, INC., OF BROOKLYN, NEW YORK, A CORPORATION OF NEW YORK

WELDED CASING

Application filed April 25, 1930. Serial No. 447,402.

This invention relates to a construction for casings composed of several parts, certain of which or all of which parts are welded together. The advantage of a welded casing over a cast metal casing is that the parts can be made of plates instead of castings and said plates are considerably lighter than the casting, thus reducing the total weight of the casing. The invention relates more particularly to casings which are called upon to withstand large forces. Such casings are, for example, the casings of gyro stabilizers in which the precession of the gyro rotor supported within the casing is utilized for the purpose of counteracting roll of a ship. The precessional movements of the gyro impresses great forces upon the casing, which, of course, is forced to move the enclosed gyro and the forces are of an order such that ordinary welded joints are not able to withstand them. It is the principal object of this invention, therefore, to provide a casing with welded parts wherein the major portion of the impressed forces is taken by the parts themselves and not by the welds. For this purpose the parts of the casing are joined together in such manner that the intermediate parts will take up the impressed forces so that the only function of the welds is to unite these parts rather than to be subjected to stress.

Further objects and advantages of this invention will become apparent in the following detailed description thereof.

In the accompanying drawing,

Fig. 1 is a vertical section through a gyro stabilizer showing a casing embodying the principles of my invention.

Fig. 2 is a vertical section through another portion of the casing of Fig. 1.

Fig. 3 is an end view of a portion of the casing of Fig. 1 adjacent the supporting gudgeon.

For the purpose of illustration, I have shown the invention as applied to the casing of a gyro stabilizer, but it will be apparent from the following description that the principles of this invention have general application.

Referring to Fig. 1, I have shown a gyro stabilizer casing enclosing a gyro rotor 10 supported upon a rotor shaft 11 which is supported in upper and lower bearings 12, said bearings being supported within the upper and lower ends of the casing. The casing includes the central drum portion 20 surrounding the rotor, an upper truncated cone portion 21, also truncated cone portions 22—23, and upper and lower closure members 24 and 25. The cone member 21 (that is, the base ring 31 thereof) is connected to the central drum member 20 by bolts and the closure members 24—25 are connected to their co-operating casing portions also by bolts. Cone member 22 is welded to central drum portion 20 as hereinafter described. Each of the cone members 21—22—23, as well as the cylindrical drum member 20 may be made of relatively light sheet metal as compared with the heavy castings heretofore employed, but it will be understood that the principles of this invention apply as well to cast metal parts or to a combination of cast metal and sheet metal parts. The cylindrical drum portion is provided with journals or gudgeons 26 supported in bearings 27 for rotation about the axis of said gudgeons.

It will be understood that in the operation of this mechanism, the gyro rotor precesses, that is, oscillates about the axis of the gudgeons 26 and so causes great force to be transmitted through the bearings 12 to the casing members. Each of the truncated cone members of the casing is shown as comprising an intermediate member joined to two end plates by welds. Thus, the member 21 comprises the intermediate member 29 connected to end members 30 and 31 by welds shown at 32—33 and 34—35. The force is transmitted to the intermediate portion 29 through end member 30 which would ordinarily place the stress upon the weld 32—33 and transmit the force through said weld through the intermediate member 29 to the other weld 34—35 and thence to the other end plate 31. By the ordinary construction the two welded joints 32—33 and 34—35 would be required to take up the entire force, and in the case of large forces, such as are met with in devices of the kind described, these welds would be highly stressed and frequently fail. I provide a construction, therefore, wherein the intermediate member itself takes up all of the impressed force so that the function of the welds is merely that of uniting the parts and not the withstanding of severe stresses. For this purpose it will be seen that I have provided each of the end members 30—31 with undercut portions 36—37 in which the ends of intermediate plate 29 engages. The transmission of force by end plate 30 to end plate 31 is, therefore, entirely through intermediate plate 29 which is placed under stress to take up the impressed force. Since the intermediate plate 29 is placed under compression and takes up the total transmitted force, the welds 32—33 and 34—35 are relieved of this compression force and, therefore, perform no other function than that of uniting the joined parts. It will be seen that exactly the same principle is applied to each of the other truncated cone portions 22—23 wherein intermediate plates 29'—29'' between end plates 30'—31' and 30''—31'' take up all of the impressed force because they are lodged in similar undercut portions 36'—37' and 36''—37''.

Since the parts are made of sheet metal and welded together, the gudgeons 26 cannot be cast integrally with the cylindrical drum 20 but must be welded thereto by welds which are shown at 40 and 41. In order to relieve the weld of the stresses caused by the force applied to the gudgeons during turning movements, I provide for a reinforcing plate 45 surrounding said gudgeons at a point removed from the point of attachment of said gudgeon to the cylindrical member 20. Said plate 45, as shown in Fig. 3, may have ribs 46 welded thereon for the purpose of reinforcing it. Here too the principle is applied of relieving the welds 40—41 by means of the supporting plate 45, of the stress caused by the impressed force. The plate 45 is directly supported between and welded to flange plates or rings 30' and 50'. The flanges 30' and 50' are welded to central drum portion 20 to be integral therewith.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A casing for gyro stabilizers comprising a plurality of sheet metal sections, certain of said sections including rotor bearing end members and sheet metal intermediate members, said members being joined together by butt joints so that the intermediate members take up all of the forces applied to the end members as compression strains on said intermediate members, said members being welded at the joints.

2. A casing for gyro stabilizers comprising a plurality of sheet metal sections having parts welded together including a central ring having flanges, gudgeons welded on said ring, and means spaced from the gudgeon welds and held between the flanges of said ring for providing support for said gudgeons independent of the welds thereon.

3. A casing for gyro stabilizers comprising a plurality of sheet metal sections having parts welded together by butt joints including a central ring having flanges, gudgeons welded on said ring, and a plate supported between the flanges on said ring and spaced from said gudgeon welds for providing support for said gudgeons independent of said welds.

4. A casing for gyro stabilizers comprising a central drum or cylindrical band surrounding the rotor, gudgeons welded thereon, annular rings welded to the top and bottom of said drum, and a reinforcing plate having an aperture therein for each gudgeon spaced from said drum and welded between said rings.

In testimony whereof I have affixed my signature.

FRANCIS P. HODGKINSON.